(12) United States Patent
Park et al.

(10) Patent No.: US 7,844,219 B2
(45) Date of Patent: Nov. 30, 2010

(54) APPARATUS AND METHOD OF ON-CHANNEL REPEATER

(75) Inventors: Sung-Ik Park, Daejeon (KR); Yong-Tae Lee, Daejeon (KR); Ho-Min Eum, Daejeon (KR); Heung-Mook Kim, Daejeon (KR); Jae-Hyun Seo, Daejeon (KR); Seung-Won Kim, Daejeon (KR); Soo-In Lee, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 14 days.

(21) Appl. No.: 11/912,536

(22) PCT Filed: Dec. 29, 2005

(86) PCT No.: PCT/KR2005/004645
§ 371 (c)(1),
(2), (4) Date: Mar. 18, 2009

(87) PCT Pub. No.: WO2006/115320
PCT Pub. Date: Nov. 2, 2006

(65) Prior Publication Data
US 2009/0209201 A1 Aug. 20, 2009

(30) Foreign Application Priority Data
Apr. 25, 2005 (KR) ...................... 10-2005-0034203

(51) Int. Cl.
*H04Q 7/20* (2006.01)
(52) U.S. Cl. ................... 455/11.1; 455/63.1; 455/20; 455/67.13
(58) Field of Classification Search ................ 455/20, 455/23, 16, 24, 11.1, 13.2, 63.1, 67.11, 67.13, 455/74; 375/211, 219, 295, 296; 348/725, 348/426, 731
See application file for complete search history.

(56) References Cited

U.S. PATENT DOCUMENTS

| 7,627,287 | B2* | 12/2009 | Moss ........................ 455/16 |
| 2005/0094750 | A1* | 5/2005 | Park et al. .................. 375/343 |
| 2009/0061766 | A1* | 3/2009 | Ding et al. ................. 455/11.1 |

FOREIGN PATENT DOCUMENTS

CN 1549473 A 11/2004

(Continued)

OTHER PUBLICATIONS

International Search Report for corresponding International Application No. PCT/KR2005/004645 dated Apr. 13, 2006.
Office Action of the Patent Office of the People's Republic of China issued on May 27, 2010 with English translation thereof.

*Primary Examiner*—John Lee
(74) *Attorney, Agent, or Firm*—Jae Y. Park; Kile Park Goekjian Reed & McManus PLLC

(57) ABSTRACT

Provided are an on-channel repeater and a method thereof. The on-channel repeater can extract reception channel information from signals transmitted from a main transmitter or another repeater, compensate for channel distortion caused on a transmission channel by inversely reflecting the extracted reception channel information to the received signals, and transmit the channel-distortion compensated signals through the same channel as a reception channel, and a method thereof. The on-channel repeater includes: a receiver for receiving RF signals transmitted from outside; a down-converter for down-converting the received RF signals into signals of a desired band; a channel-estimator for estimating an inverse value of a reception channel based on the down-converted signals; an adaptation filter for compensating for channel distortion by using a filter having the inverse value of the estimated reception channel; an up-converter for up-converting the channel distortion-compensated signals into RF signals; and a transmitter for transmitting the up-converted RF signals.

22 Claims, 13 Drawing Sheets

FOREIGN PATENT DOCUMENTS

| | | |
|---|---|---|
| JP | 2003174392 | 6/2003 |
| KR | 2002-0088304 | 11/2002 |
| KR | 10-2004-0097683 | 11/2004 |
| KR | 10-2004-0099878 | 12/2004 |
| KR | 20040102635 | 12/2004 |
| KR | 10-2005-0029569 | 3/2005 |
| KR | 10-2005-0040636 | 5/2005 |
| WO | 2004/002015 A2 | 12/2003 |

* cited by examiner

APPARATUS AND METHOD OF ON-CHANNEL REPEATER

TECHNICAL FIELD

The present invention relates to an on-channel repeater and a method thereof; and, more particularly, to an on-channel repeater that estimates reception channel information from signals transmitted from a main transmitter or other repeaters, compensates channel distortion caused in a transmission channel based on the estimated reception channel information, and repeats signals after compensating channel distortion, and a method thereof.

BACKGROUND ART

Generally, main transmitters and repeaters are disposed based on natural geographical features and service areas. Repeaters are set up in areas where signals from a main transmitter are received weak to resolve the problem of instable signal reception and widen the coverage of the main transmitter.

FIG. 1 shows a service using conventional repeaters, which repeat signals by using different frequencies.

In the service using conventional repeaters of FIG. 1, a main transmitter 101 transmits signals through a transmission frequency A, and repeaters 102 to 105 repeat the signals through frequencies B, C, D and E, which are different from the transmission frequency A. In other words, the conventional repeaters 102 to 105 shown in FIG. 1 resolves the instability in receiving signals transmitted from the main transmitter 101 and expands the service coverage of the main transmitter 101 by using different frequencies B, C, D and E.

Since the repeaters 102 to 105 use different frequencies to repeat the signals, it is inefficient in the respect of frequency usage because it requires many frequency resources.

FIG. 2 shows another service employing conventional repeaters 202 to 205, which repeat signals by using the same frequency as that of a main transmitter 201. In short, the main transmitter transmits signals through a transmission frequency A, and the repeaters 202 to 205, which will be referred to as on-channel repeaters, hereinafter, repeat the signals through the same frequency as the transmission frequency A. To provide the service, signals transmitted from the main transmitter 201 and the on-channel repeaters 202 to 205 should be the same and time delay between them should be small.

In other words, when the signals transmitted from the main transmitter and the on-channel repeaters which use the same frequency band are not the same, signals in the same frequency band become noise to each other and the noise signals become on-channel interference signals that are not removed by an equalizer or other devices in a receiver. Also, signals transmitted from the main transmitter and the on-channel repeaters have time delay that goes out of the multi-path signal removal ability of the equalizer at the receiver, the equalizer of the receiver cannot remove the delayed signals.

Therefore, to provide the service using the on-channel repeaters, the output signals of the on-channel repeaters should be the same as the output signals of the main transmitter and time delay between two output signals should be small.

The following explanation is provided to illustrate the drawbacks occurring when signals are repeated using the conventional on-channel repeater with reference to FIGS. 3 to 6.

FIG. 3 illustrates an exemplary view of a conventional RF amplification on-channel repeater.

As shown in the drawing, in the conventional RF amplification on-channel repeater, a RF broadcast signal is received from a main transmitter through a receiving antenna 301 and a RF receiver 302, and the received RF signal passes through a RF band pass filter 303 only at a desired signal band. The band passed RF signal is amplified through a high power amplifier 304 and transmitted through a transmitting antenna 305 of the on-channel repeater over an on-channel. The RF amplification on-channel repeater has a low system delay and a simple structure.

FIG. 4 describes an exemplary view of a conventional IF conversion on-channel repeater.

As shown in the drawing, in the conventional IF conversion on-channel repeater, a RF broadcast signal is received from a main transmitter through a receiving antenna 401 and a RF receiver 402. The received RF signal is converted into an IF signal through an IF down-converter 403, and the IF signal passes through the IF band pass filter 404 only at a desired signal band. The band passed IF signal is converted into a RF broadcast signal through the RF up-converter 405, and the RF broadcast signal is amplified through a high power amplifier 406 and then transmitted through a transmitting antenna 407. The IF conversion on-channel repeater also has a low system delay and a simple structure. Further, a selection characteristic of the band pass filter is superior to that of the RF amplification on-channel repeater of FIG. 3.

FIG. 5 illustrates an exemplary view of a conventional Surface Acoustic Wave (SAW) filter on-channel repeater.

As shown in the drawing, in the conventional SAW filter on-channel repeater, a RF broadcast signal is received from a main transmitter through a receiving antenna 501 and a RF receiver 502, and the received RF broadcast signal is converted into an IF signal through an IF down-converter 503. The IF signal passes through an SAW filter 504 only at a desired signal band, and the SAW filtered IF signal is converted into a RF broadcast signal through a RF up-converter 505. The RF broadcast signal is amplified through a high power amplifier 506 and then transmitted through a transmitting antenna 507. The SAW filter on-channel repeater has also a low system delay and a simple structure. Further, a selection characteristic of the SAW filter is superior to that of the IF conversion on-channel repeater of FIG. 4.

FIG. 6 illustrates an exemplary view of a conventional demodulation/modulation on-channel repeater. As shown in the drawing, in the conventional demodulation/modulation on-channel repeater, a RF broadcast signal is received from a main transmitter through a receiving antenna 601 and a RF receiver 602. The received RF broadcast signal is converted into an IF signal through an IF down-converter 603. The IF signal is converted into a baseband signal through a demodulator 604. The multi-path signals, noise generated due to the transmission channel between the main transmitter and the on-channel repeater, and feedback signals caused by low isolation are removed from the baseband signal in an equalizer and forward error correction (FEC) decoder 605. The output signal of the equalizer and FEC decoder 605 is error-correction encoded through FEC encoder 606. The FEC-encoded signal is converted into an IF band broadcasting signal through a modulator 607. The converted IF signal is converted into a RF broadcast signal through a RF up-converter 608. The RF broadcast signal is amplified through a high power amplifier 609 and transmitted through a transmitting antenna 610.

In the conventional on-channel repeater in FIGS. 3 to 5, the characteristics of the output signals of the on-channel repeaters are inferior to those of the input signals of the on-channel repeaters since the noise and multi-path signals generated due to the transmission channel between the main transmitter and the on-channel repeater, the feedback signal generated due to the low isolation of the transmitting/receiving antennas, and a system noise added from an on-channel repeater system, etc. cannot be removed. The above mentioned conventional on-channel repeaters shown in FIGS. 3 to 6 have drawbacks in that the transmission power of the on-channel repeater is limited due to the feedback signal generated due to the low isolation of the transmitting/receiving antennas.

The conventional on-channel repeater having a modulator and a demodulator in FIG. 6 improves the poor multi-path and noise elimination ability of the conventional on-channel repeaters in FIGS. 3 to 5 remarkably. However, since the conventional demodulation/modulation on-channel repeater in FIG. 6 includes a FEC decoder and a FEC encoder, the time delay in the on-channel repeater is increased from microseconds to milliseconds. Since the output signal generated due to ambiguity of a general standard trellis encoder of FIG. 6 is recognized as noise, the on-channel repeater does not remove the output signal generated due to ambiguity.

Accordingly, to solve the above-mentioned drawbacks, an on-channel repeater is required, which can output the same signal as the output signal of the main transmitter, has low time delay between two output signals, removes the noise and multi-path signals generated by the transmission channel between the main transmitter and the on-channel repeater so that the output signal of the on-channel repeater has a superior characteristic to that of the input signal, and removes the feedback signal generated by the low isolation between the transmitting/receiving antennas so that the transmission output power of the on-channel repeater can be increased.

DISCLOSURE

Technical Problem

It is, therefore, an object of the present invention to provide an on-channel repeater that can extract reception channel information from signals transmitted from a main transmitter or another repeater, compensate for channel distortion caused on a transmission channel by inversely reflecting the extracted reception channel information to the received signals, and transmit the channel distortion-compensated signals through the same channel as a reception channel, and a method thereof.

The other objects and advantages of the present invention can be understood by the following description and they will become more apparent with reference to preferred embodiments. Also, it is obvious to those skilled in the art of the present invention that the objects and advantages of the present invention can be realized by the means as claimed and combinations thereof.

Technical Solution

In accordance with one aspect of the present invention, there is provided an on-channel repeater for repeating signals through on-channel, which includes: a receiver for receiving radio frequency (RF) signals transmitted from outside; a down-converter for down-converting the received RF signals into signals of a desired band; a channel-estimator for estimating an inverse value of a reception channel based on the down-converted signals; an adaptation filter for compensating for channel distortion by using a filter having the inverse value of the estimated reception channel; an up-converter for up-converting the channel distortion-compensated signals into RF signals; and a transmitter for transmitting the up-converted RF signals.

In accordance with another aspect of the present invention, there is provided an on-channel repeater for repeating signals through on-channel, which includes: a receiver for receiving RF signals transmitted from outside; a down-converter for converting the received RF signals into signals of a desired band; a digital-analog converter for converting the down-converted signals into digital signals; a channel-estimator for estimating an inverse value of a reception channel based on the digital signals; an adaptation filter for compensating for channel distortion by using a filter having the inverse value of the estimated reception channel; an analog-digital converter for converting the channel distortion-compensated signals into analog signals; an up-converter for up-converting the analog signals into RF signals; and a transmitter for transmitting the up-converted RF signals.

In accordance with another aspect of the present invention, there is provided a method for repeating signals through on-channel, the method which includes the steps of: a) receiving RF signals transmitted from outside in a repeater; b) down-converting the received RF signals into signals of a desired band; c) estimating an inverse value of a reception channel of the repeater based on the down-converted signals; d) compensating for distortion on a transmission channel by using a filter having the inverse value of the estimated reception channel; e) up-converting the channel distortion-compensated signals into RF signals; and f) transmitting the RF signals.

In accordance with another aspect of the present invention, there is provided a method for repeating signals through on-channel, the method which includes the steps of: a) receiving RF signals transmitted from outside in a repeater; b) converting the received RF signals into signals of a desired band; c) converting the down-converted signals into digital signals; d) estimating an inverse value of a reception channel based on the digital signals; e) compensating for channel distortion by using a filter having the inverse value of the estimated reception channel; f) converting the channel distortion-compensated signals into analog signals; g) up-converting the analog signals into RF signals; and h) transmitting the up-converted RF signals.

ADVANTAGEOUS EFFECTS

The on-channel repeater and a repeating method thereof, which are suggested in the present invention, transmit the same signals as output signals of a main transmitter, have a short time delay from the output signals of the main transmitter, repeat signals obtained after compensating for transmission channel distortion, and improve usage efficiency of limited frequency resources.

DESCRIPTION OF DRAWINGS

The above and other objects and features of the present invention will become apparent from the following description of the preferred embodiments given in conjunction with the accompanying drawings, in which.

DESCRIPTION ON MAJOR PARTS OF THE DRAWINGS

Figure 1:
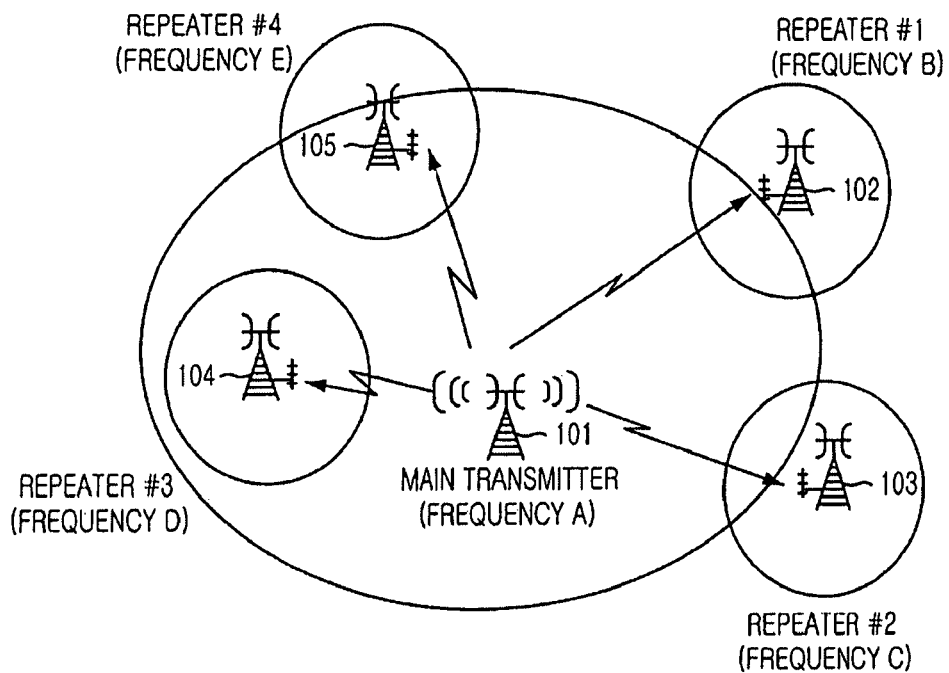
FIG. 1 is an exemplary view illustrating a service using conventional repeaters.
Figure 2:
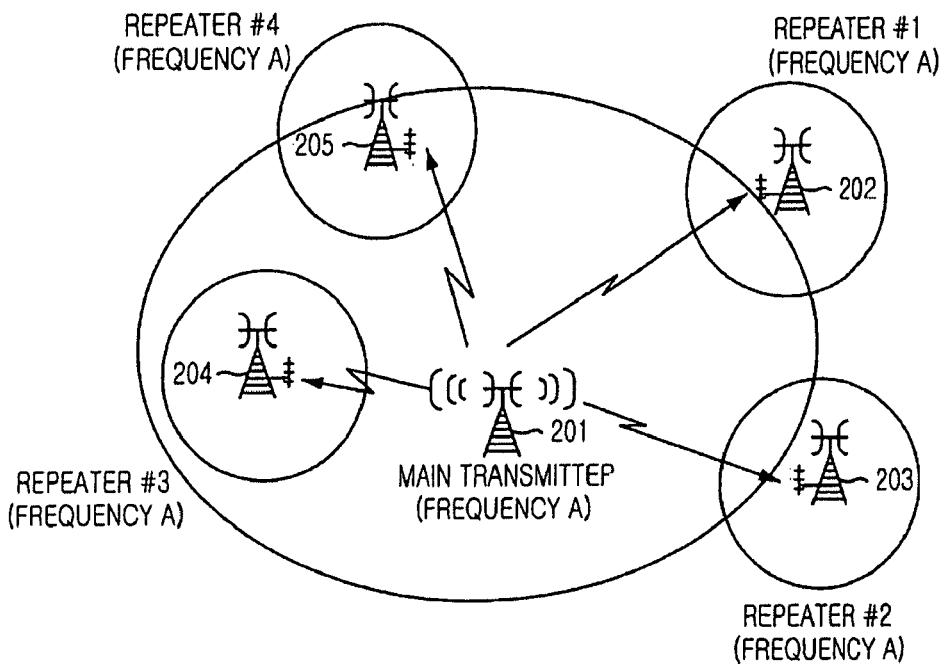
FIG. 2 is another exemplary view illustrating a service using conventional repeaters.
Figure 3:
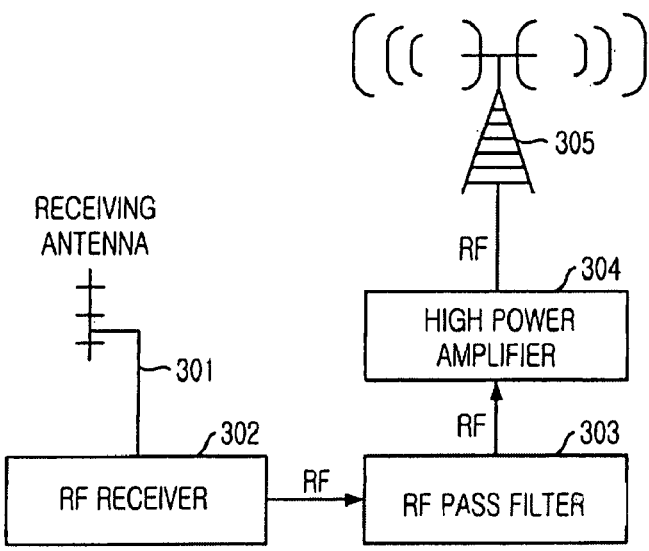
FIG. 3 is a block view showing a structure of a conventional radio frequency (RF) amplification on-channel repeater.
Figure 4:
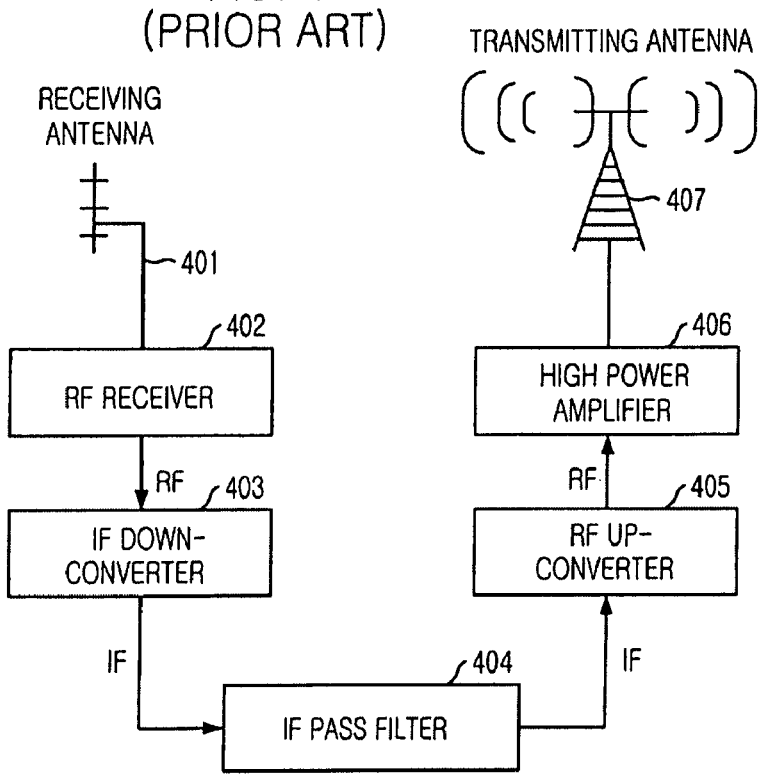
FIG. 4 is a block view describing a structure of a conventional intermediate frequency (IF) transformation on-channel repeater.
Figure 5:
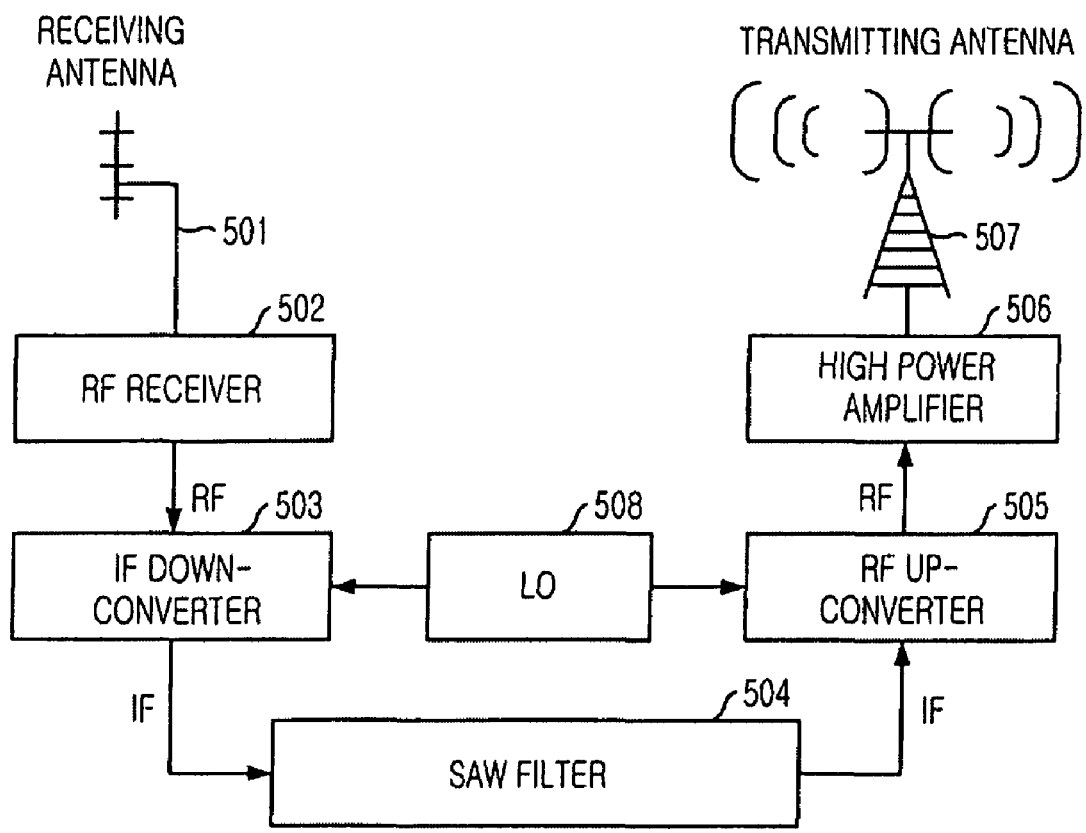
FIG. 5 is a block view describing a structure of a conventional Surface Acoustic Wave (SAW) filter on-channel repeater.
Figure 6:
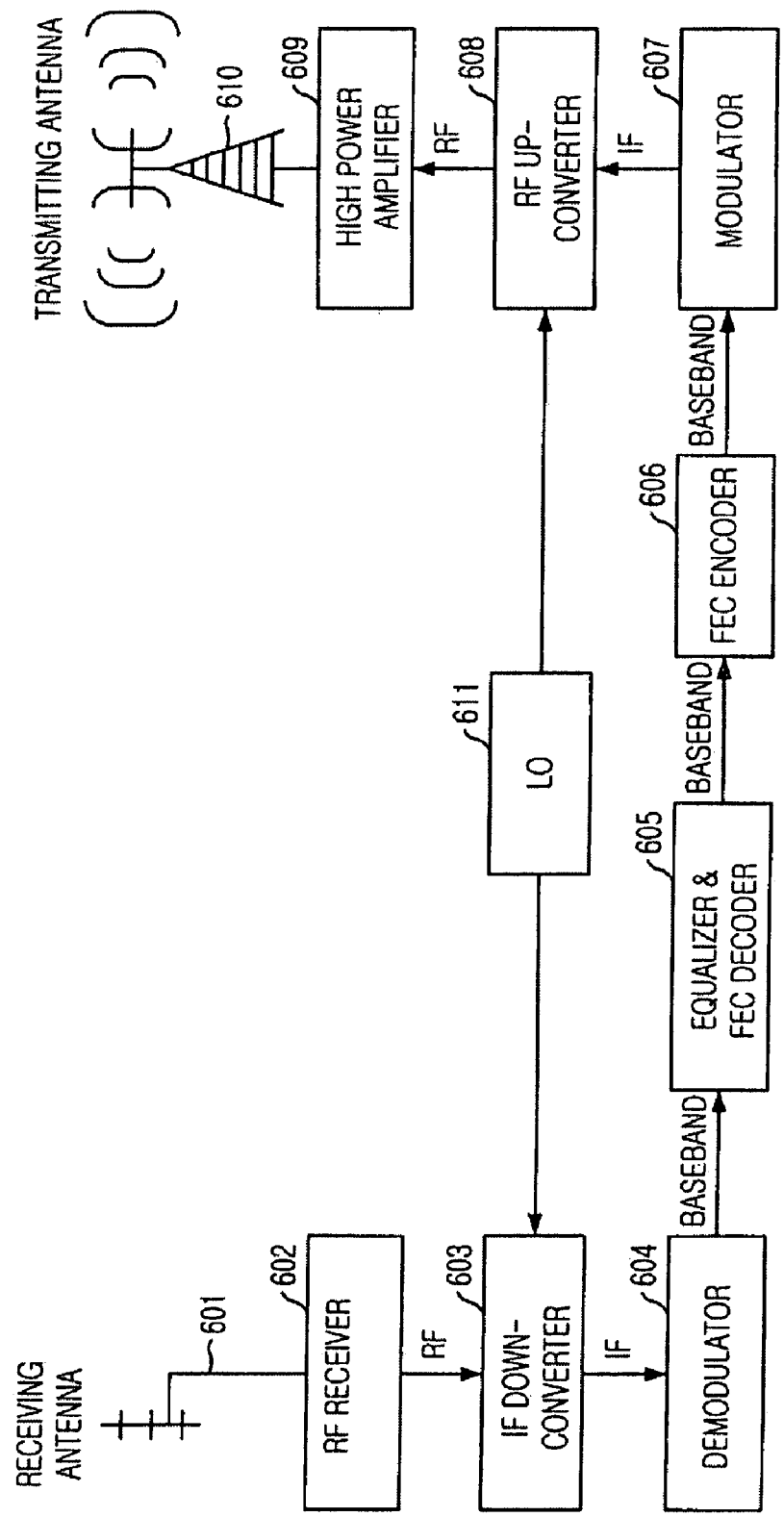
FIG. 6 is a block view illustrating an on-channel repeater going through demodulation/modulation.

701: RF receiver
702: Frequency down-converter
703: Inverse channel estimator
704: Adaptation filter
705: Frequency up-converter
706: RF Transmitter

BEST MODE FOR THE INVENTION

Other objects and aspects of the invention will become apparent from the following description of the embodiments with reference to the accompanying drawings, which is set forth hereinafter.

Figure 7:
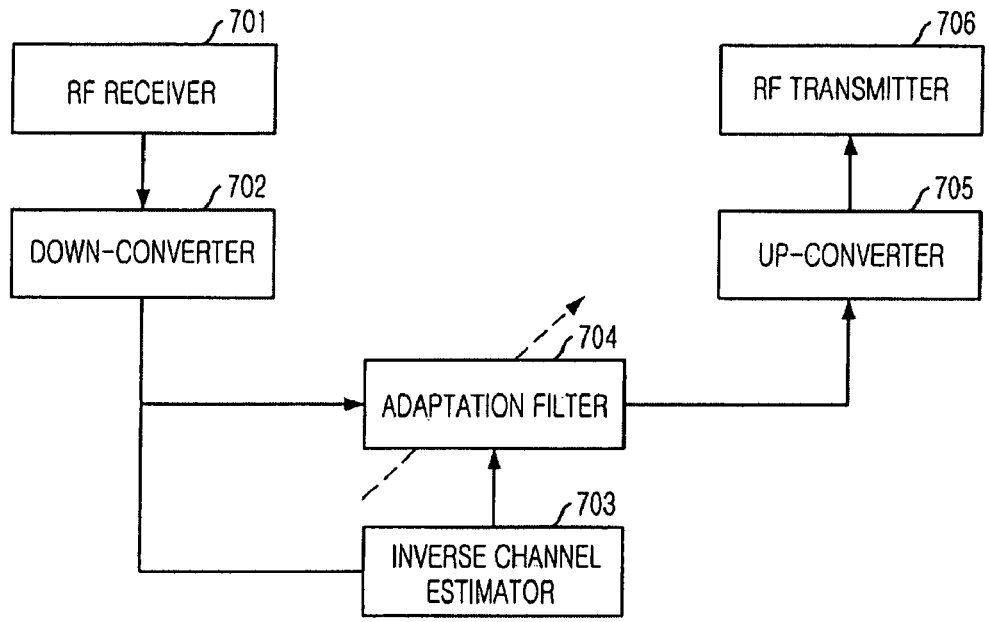
FIG. 7 is a block view describing an on-channel repeater in accordance with a first embodiment of the present invention.

FIG. 7 is a block view describing an on-channel repeater in accordance with a first embodiment of the present invention.

As shown in FIG. 7, the on-channel repeater of the present invention includes a radio frequency (RF) receiver 701, a frequency down-converter 702, an inverse channel estimator 703, an adaptation filter 704, a frequency up-converter 705, and an RF transmitter 706.

The RF receiver 701 receives RF signals transmitted from the main transmitter, and the frequency down-converter 702 down-converts the RF signals received in the RF receiver 701 into signals of a desired frequency band.

Meanwhile, the inverse channel estimator 703 estimates an inverse of a repeater reception channel including multi-path signals generated by a transmission channel, between a transmitter and a repeater, and feedback signals generated by low isolation of a transmitting/receiving antennas of an on-channel repeater.

The adaptation filter 704 compensates for channel distortion of the signals obtained from the frequency down-conversion in the frequency down-converter 702 through the adaptation filter by using the reception channel inverse information of the repeater estimated by the inverse channel estimator 703.

In short, the inverse channel estimator 703 estimates a reception channel between the transmitter and the on-channel repeater and transmits an inverse value of the estimated reception channel information to the adaptation filter 704. The adaptation filter 704 eventually compensates for reception channel distortion by reflecting the inverse value of the reception channel information transmitted from the inverse channel estimator 703 to output signals of the frequency down-converter 702.

The frequency up-converter 705 up-converts the channel distortion-compensated signals back into RF signals, and the RF transmitter 706 transmits the RF signals obtained from the frequency up-conversion in the frequency up-converter 705.

Figure 8:
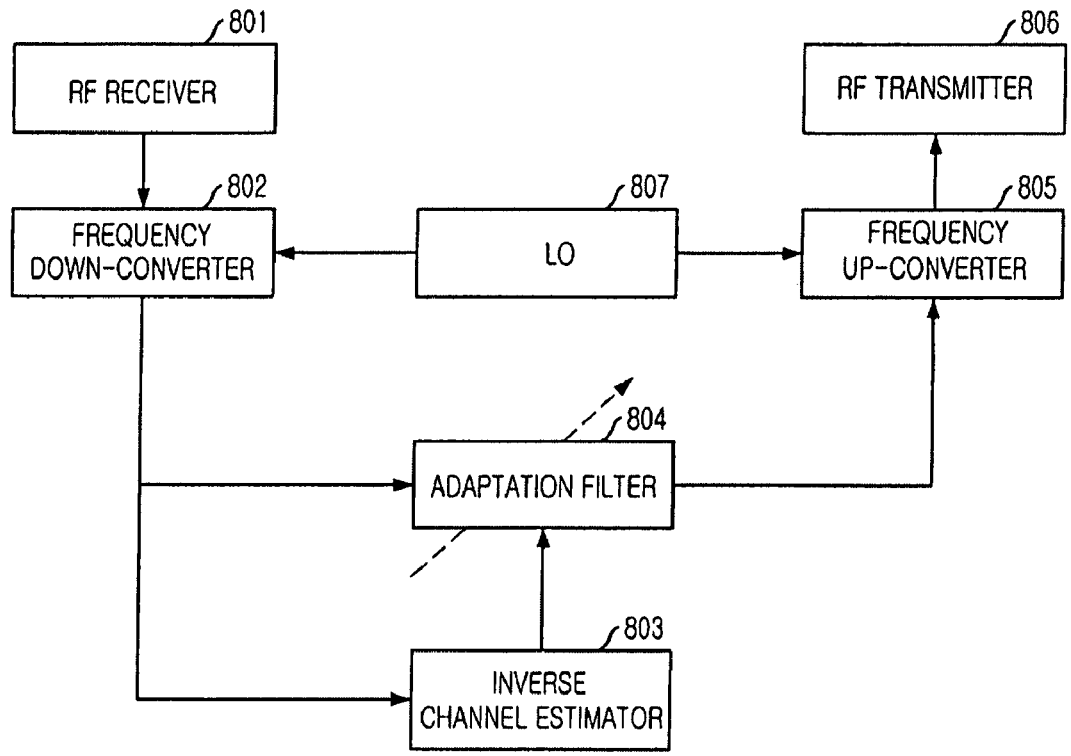
FIG. 8 is a block view describing an on-channel repeater in accordance with a second embodiment of the present invention.

FIG. 8 shows a block view of an on-channel repeater in accordance with a second embodiment of the present invention.

As shown in the drawing, the on-channel repeater of the present invention includes an RF receiver 801, a frequency down-converter 802, an inverse channel estimator 803, an adaptation filter 804, and a frequency up-converter 805, an RF transmitter 806, and a local oscillator (LO) 807.

The RF receiver 801 receives the RF signals transmitted from the main transmitter, and the frequency down-converter 802 down-converts the RF signals received through the RF receiver 801 into signals of a desired band based on a first reference frequency signal provided from the local oscillator 807.

Meanwhile, the inverse channel estimator 803 estimates an inverse value of a repeater reception channel including multi-path signals generated by a transmission channel between the transmitter and the on-channel repeater from the frequency-down-converted signals obtained in the frequency down-converter 802 and feedback signals generated due to a low isolation of the transmitting/receiving antennas of the on-channel repeater.

The adaptation filter 804 compensates for channel distortion of the frequency down-converted signals obtained in the frequency down-converter 802 through the adaptation filter by using the reception channel inverse information of the on-channel repeater, which is estimated in the inverse channel estimator 803.

In short, the inverse channel estimator 803 estimates the reception channel between the transmitter and the on-channel repeater and transmits an inverse value of the estimated reception channel information to the adaptation filter 804. The adaptation filter 804 finally compensates for the reception channel distortion of the signals received in the on-channel repeater by reflecting the inverse value of the reception channel information transmitted from the inverse channel estimator 803 to the signals outputted from the frequency down-converter 802.

The frequency up-converter 805 up-converts the channel distortion-compensated signals obtained in the adaptation filter 804 into RF signals based on a second reference frequency signal provided from the local oscillator 807, and the RF transmitter 806 amplifies and transmits the RF signals obtained from the up-conversion in the frequency up-converter 805.

Figure 9:
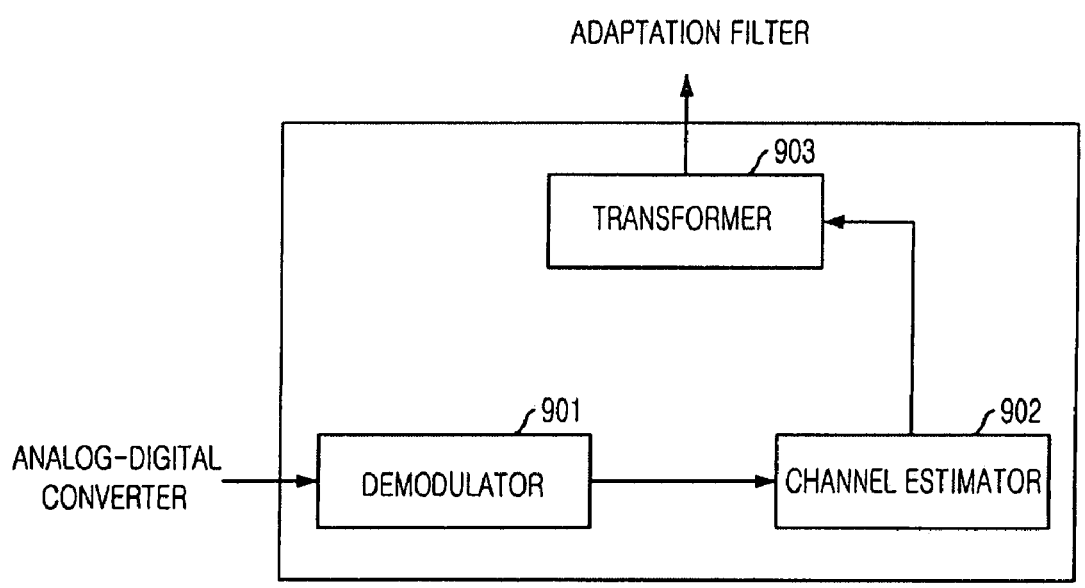
FIG. 9 is a block view showing an inverse channel estimator of FIGS. 7 and 8.

FIG. 9 is a block view showing an inverse channel estimator of FIGS. 7 and 8. As illustrated in FIG. 9, the inverse channel estimator 803 includes a demodulator 901, a channel estimator 902, and a transformer 903.

The demodulator 901 demodulates the frequency down-converted signals obtained in the frequency down-converter 702 or 802 into baseband signals. The channel estimator 902 estimates a reception channel of an on-channel repeater which includes multi-path signals generated by the transmission channel between the transmitter and the on-channel repeater and the feedback signals generated due to a low isolation of the transmitting/receiving antennas of the on-channel repeater, both from the demodulated baseband signals obtained in the demodulator 901.

The transformer 903 acquires an inverse value of the estimated reception channel information of the on-channel repeater and transmits the inverse value to the adaptation filter 704 or 804. The adaptation filter 704 or 804 finally compensates for reception channel distortion of the signals received in the on-channel repeater by reflecting the inverse value of the transmitted reception channel information to the output signals of the frequency down-converter 702 or 802.

The structure of the inverse channel estimator 703 or 803 including the demodulator 901, the channel estimator 902 and the transformer 903 can be realized diversely according to the system standards. Exemplary embodiments of the demodulator 901, the channel estimator 902 and the transformer 903 will be described later on.

Figure 10:
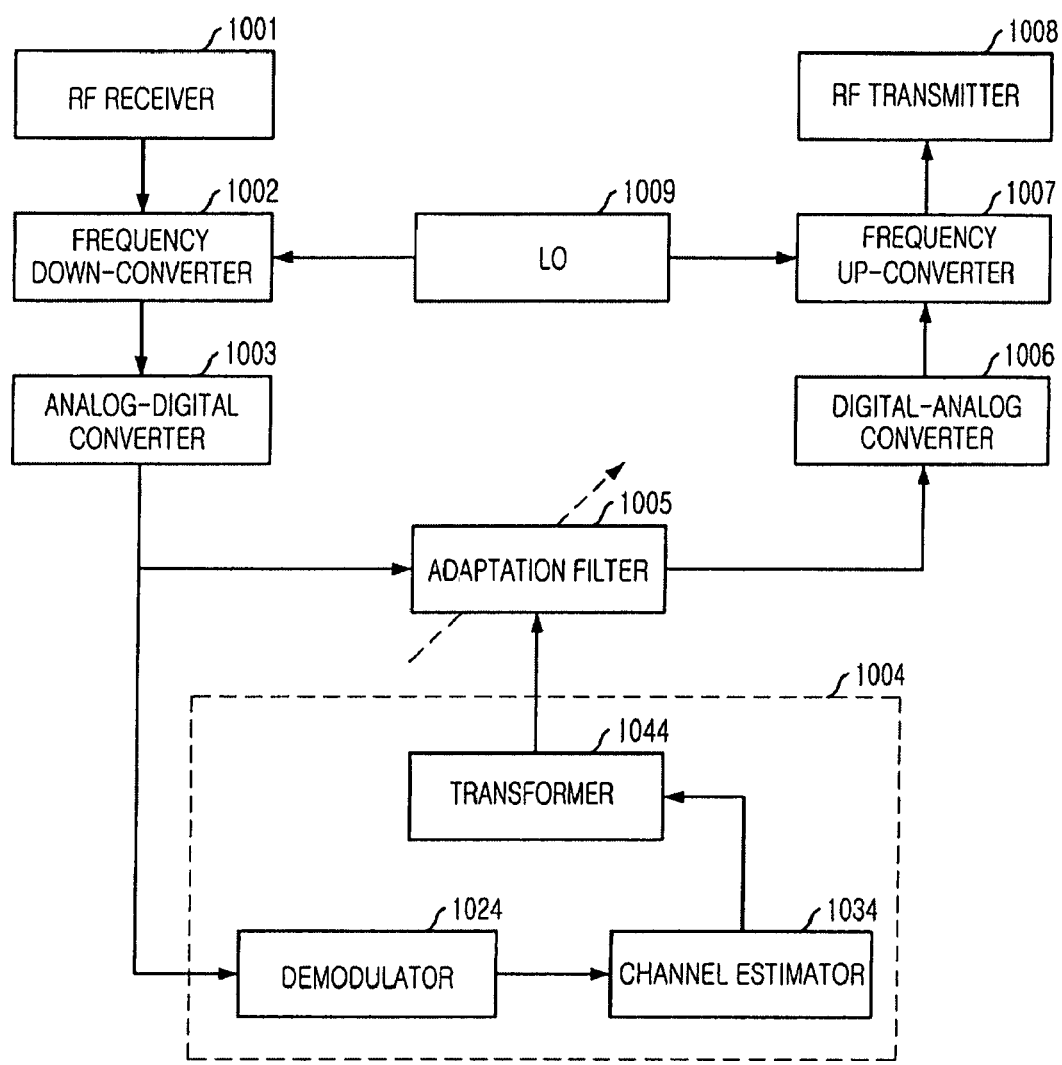
FIG. 10 is a block view illustrating an on-channel repeater in accordance with a third embodiment of the present invention.

FIG. 10 illustrates a block view of an on-channel repeater in accordance with a third embodiment of the present invention. As described in the drawing, the on-channel repeater of the present invention includes an RF receiver 1001, a frequency down-converter 1002, an analog-digital converter 1003, an inverse channel estimator 1004, an adaptation filter 1005, a digital-analog converter 1006, a frequency up-converter 1007, an RF transmitter 1008, and a local oscillator 1009.

The RF receiver 1001 receives RF signals transmitted from the main transmitter, and the frequency down-converter 1002 down-converters the RF signals received in the RF receiver 1001 into signals of a desired band based on a first reference frequency signal provided from a local oscillator 1009.

The analog-digital converter 1003 converts the frequency down-converted signals obtained in the frequency down-converter 1002 into digital signals and transmits the digital signals to the adaptation filter 1005 and a demodulator 1024 of the inverse channel estimator 1004.

The demodulator 1024 of the inverse channel estimator 1004 demodulates the transmitted digital signals into baseband signals. The channel estimator 1034 estimates a reception channel of an on-channel repeater which includes multi-path signals generated by a transmission channel between the transmitter and the on-channel repeater and feedback signals generated due to a low isolation of the transmitting and receiving antennas of the on-channel repeater, both from the demodulated baseband signals. The transformer 1044 acquires an inverse value of the estimated reception channel information of the on-channel repeater obtained in the channel estimator 1034, and transmits the inverse value to the adaptation filter 1005.

The adaptation filter 1005 compensates for the reception channel distortion of the signals received in the on-channel repeater by reflecting the inverse value of the reception channel information into the output signals of the analog-digital converter 1003.

The digital-analog converter 1006 converts the distortion-compensated digital signals obtained in the adaptation filter 1005 into analog signals. The frequency up-converter 1007 up-converts the analog signals into RF signals based on the second reference frequency signals provided by the local oscillator 1009.

The RF transmitter 1008 performs high-power amplification on the frequency up-converted RF signals and transmits the amplified signals.

Figure 11:
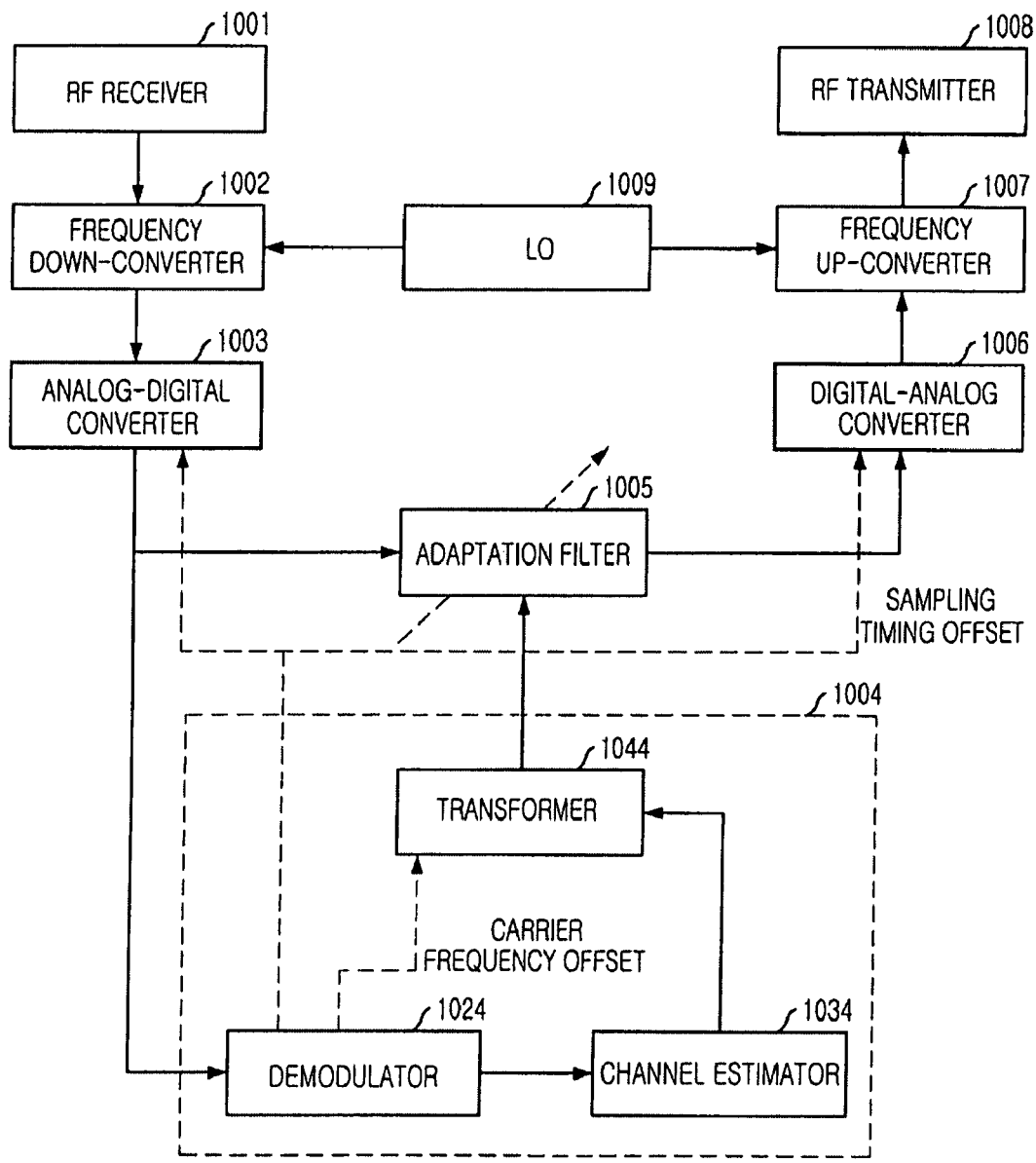
FIG. 11 is a block view illustrating an on-channel repeater in accordance with a fourth embodiment of the present invention.

FIG. 11 illustrates a block view of an on-channel repeater in accordance with a fourth embodiment of the present invention. Referring to FIG. 11, a method for frequency synchronizing the receiving signals and the output signals of the on-channel repeater will be described hereinafter. Herein, the same reference numerals shown in FIG. 10 indicate the same constituent elements that perform the same function.

As shown in FIG. 11, the demodulator 1024 of the inverse channel estimator 1004 demodulates the digital signals outputted from the analog-digital converter 1003 into signals of a baseband, extracts a carrier frequency offset and sampling timing offset, transmits the carrier frequency offset to the transformer 1044 and the sampling timing offset to the analog-digital converter 1003 and the digital-analog converter 1006.

The transformer 1044 synchronizes the center frequency of the output signals in the inverse channel estimator 1004 with the center frequency of the output signals in the analog-digital converter 1003 by reflecting the transmitted carrier frequency offset. The analog-digital converter 1003 and the digital-analog converter 1006 synchronizes the frequencies of the transmitting and receiving signals of the on-channel repeater by performing signal sampling based on the sampling timing offset.

Figure 12:
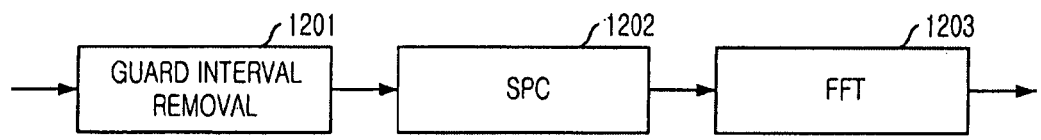
FIG. 12 is a block view describing a demodulator for an inverse channel estimator.
Figure 13:
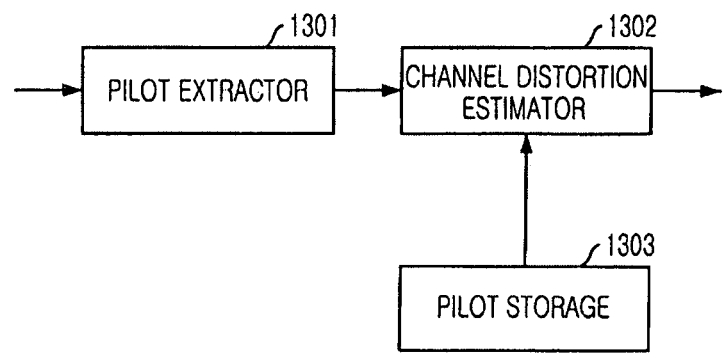
FIG. 13 is a block view showing a channel estimator for the inverse channel estimator.
Figure 14:
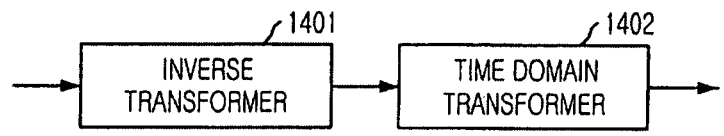
FIG. 14 is a block view describing a transformer for the inverse channel estimator.

Referring to FIGS. 12 to 14, the exemplary structures of the demodulator, the channel estimator, and the transformer for the inverse channel estimator will be described by taking a DVB-T DTV standard using an Orthogonal Frequency Division Multiplexing (OFDM) modulation as an example.

FIG. 12 is a block view describing a demodulator for an inverse channel estimator. As illustrated in FIG. 12, the demodulator for the inverse channel estimator includes a guard interval removal 1201, a serial-to-parallel converter (SPC) 1202, and a Fast Fourier Transform (FFT) 1203.

The guard interval removal 1201 eliminates guard intervals from the digital signals obtained from the analog-digital converter. The SPC 1202 converts the signals without the guard intervals, which are obtained in the guard interval removal 1201, into parallel signals. The FFT 1203 transforms the parallel signals obtained in the SPC 1202 into signals of a frequency domain.

FIG. 13 is a block view showing a channel estimator for the inverse channel estimator. As shown in FIG. 13, the channel estimator includes a pilot extractor 1301, a channel distortion estimator 1302, and a pilot storage 1303.

The pilot extractor 1301 extracts pilot signals from the signals whose domain is transformed into a frequency domain in the FFT 1203. The channel distortion estimator 1302 compares the pilot signals extracted in the pilot extractor 1301 and the predetermined pilot signals stored in the pilot storage 1303 and estimates distortion of the reception channel including multi-path signals and feedback signals.

FIG. 14 is a block view describing a transformer for the inverse channel estimator. As illustrated in FIG. 14, the transformer includes an inverse transformer 1401 for generating an inverse value of the channel distortion estimated in the channel distortion estimator 1302, and a time domain transformer 1402 for transforming the inverse value of the channel distortion generated in the inverse transformer 1401 into time-domain signals and transmits the time-domain signals to the adaptation filter.

Figure 15:
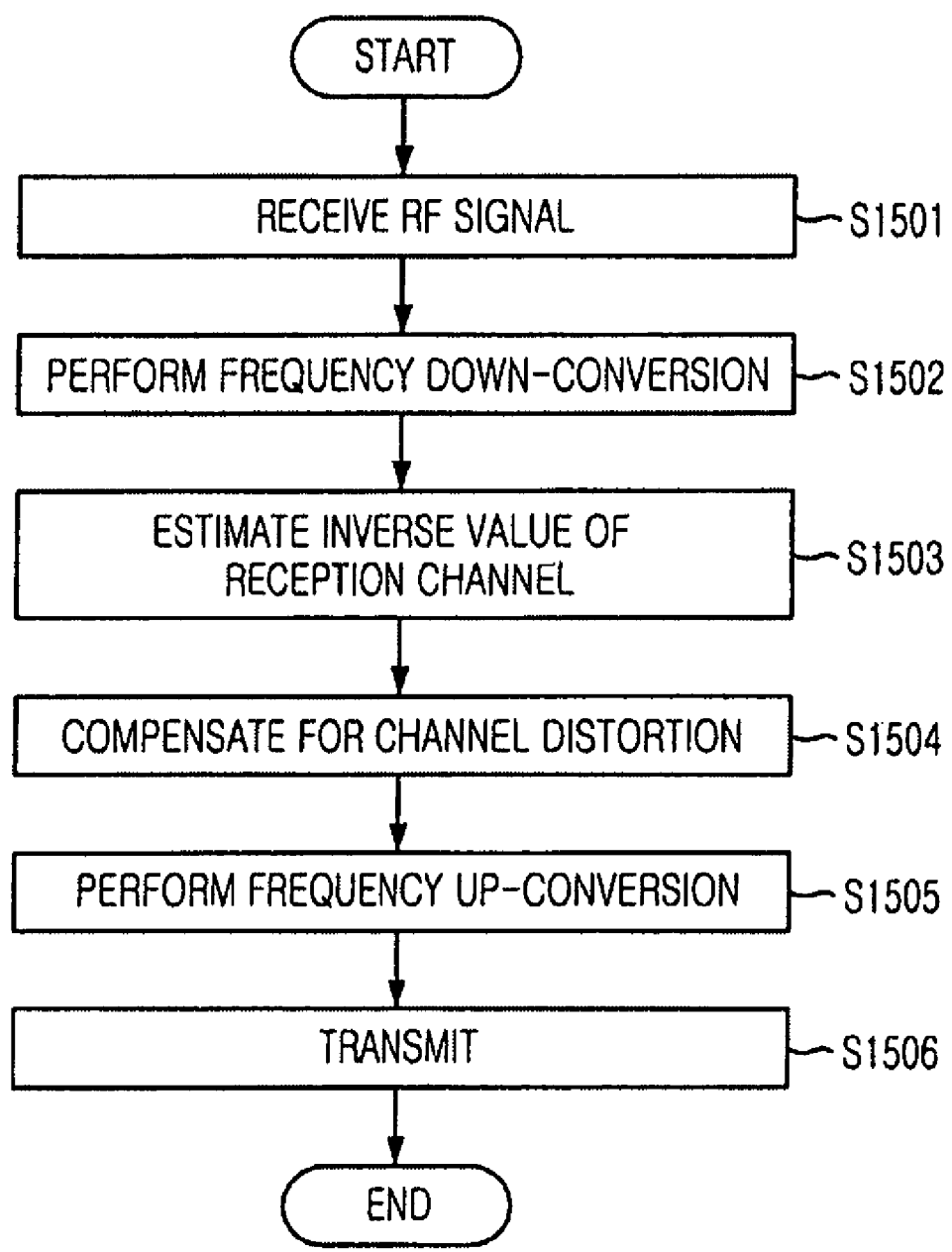
FIG. 15 is a flowchart describing a method for repeating signals though an on-channel in accordance with an embodiment of the present invention.

FIG. 15 is a flowchart describing a method for repeating signals though an on-channel in accordance with an embodiment of the present invention.

As shown in FIG. 15, the method for repeating signals through on-channels starts with receiving RF signals transmitted from the main transmitter or another repeater in step S1501. In step S1502, the received RF signals are down-converted into signals of a desired band.

Subsequently, an inverse value of a reception channel of an on-channel repeater which includes multi-path signals generated by a transmission channel and feedback signals generated due to a low isolation of the transmitting and receiving antennas of the on-channel repeater, both from the down-converted signals, is estimated in step S1503.

In step S1504, channel distortion such as multi-path signals and feedback signals are compensated in an adaptation filter having the estimated reception channel information. In step S1505, the channel distortion-compensated signals are up-converted into RF signals and, in step S1506, the RF signals are transmitted.

Figure 16:
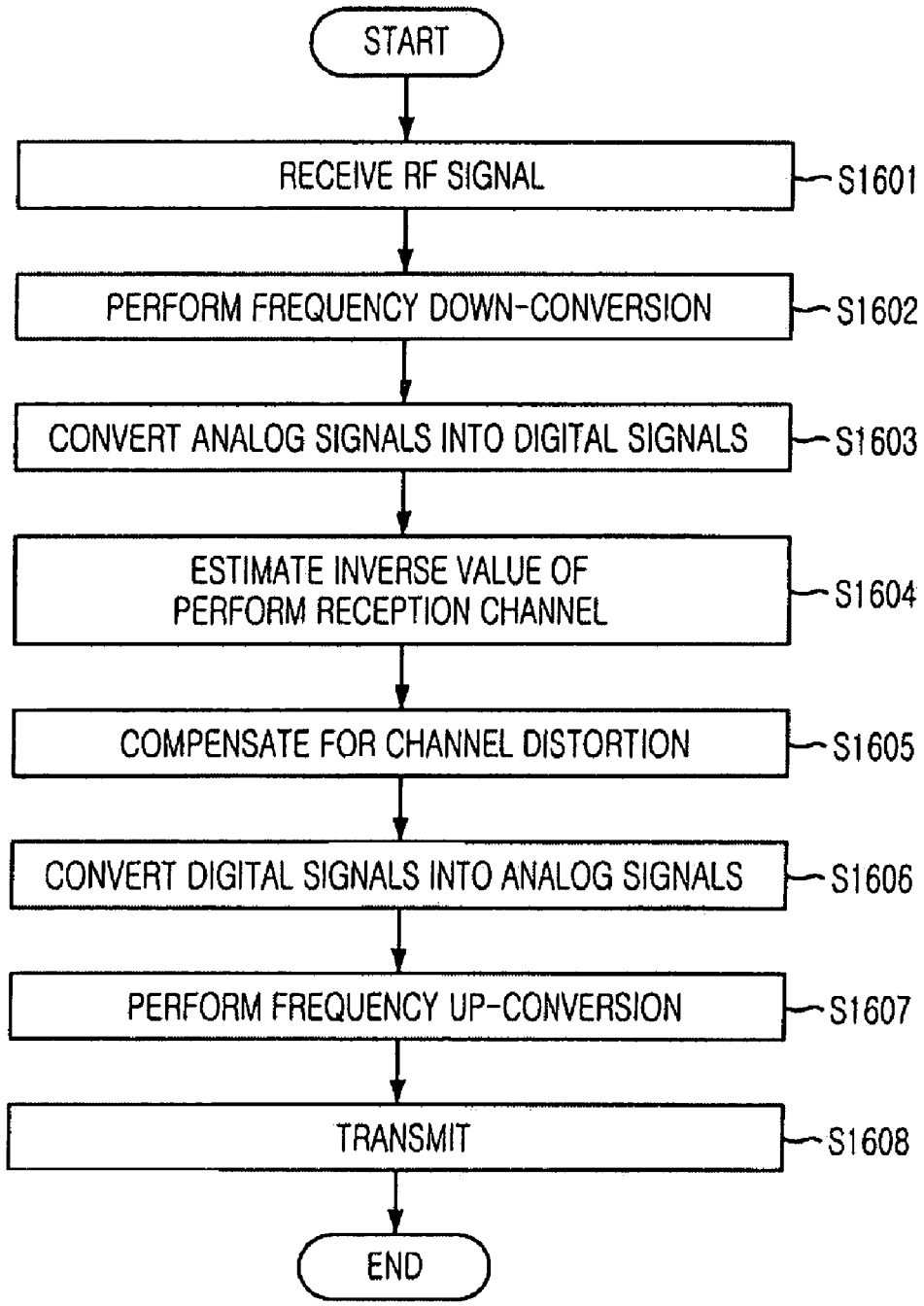
FIG. 16 is a flowchart describing a method for repeating signals though an on-channel in accordance with another embodiment of the present invention.

FIG. 16 is a flowchart describing a method for repeating signals though an on-channel in accordance with another embodiment of the present invention.

According to the signal repeating method through on-channels, which is illustrated in FIG. 16, RF signals transmitted from the main transmitter or another repeater are received in step S1601. In step S1602, the received RF signals are down-converted into signals of a desired band.

Subsequently, the down-converted analog signals are converted into digital signals in step S1603. In step S1604, an inverse value of a reception channel of an on-channel repeater which includes multi-path signals generated by a transmission channel and feedback signals generated due to a low isolation of the transmitting and receiving antennas of the on-channel repeater, both from the digital signals, is estimated in step S1604.

In step S1605, channel distortion such as multi-path signals and feedback signals are compensated by filtering the digital signals obtained from the conversion in the step S1603 in an adaptation filter having the estimated reception channel information.

In step S1606, the channel distortion-compensated digital signals are converted into analog signals and, in step S1607, the analog signals are up-converted into RF signals and transmitted in step S1608.

Figure 17:
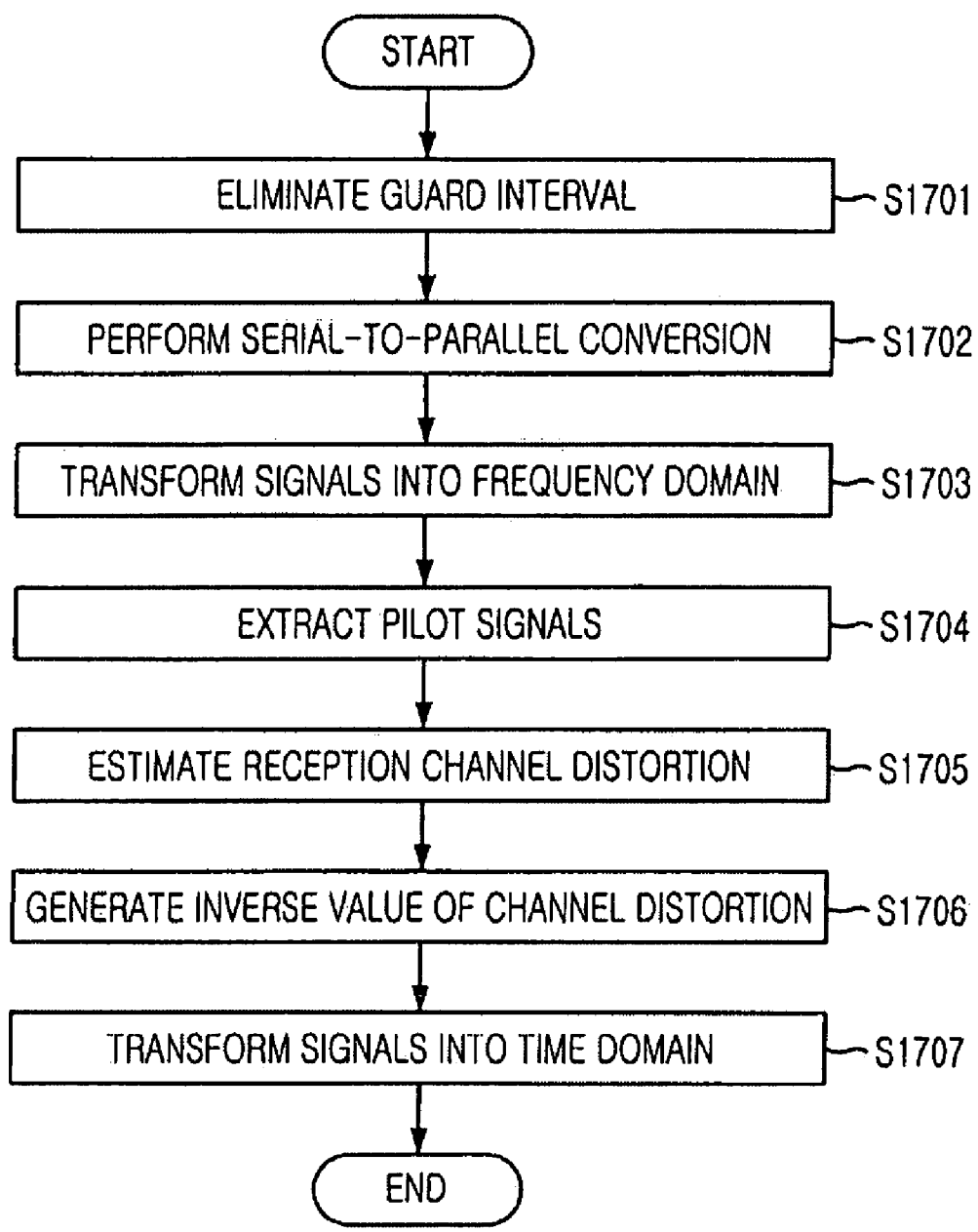
FIG. 17 is a flowchart describing a reception channel inverses estimation process of FIG. 16.

FIG. 17 is a flowchart describing a reception channel inverses estimation process of FIG. 16.

As shown in the drawing, guard intervals are removed from the digital signals obtained in the analog-digital converter in step S1701 to thereby produce signals without guard intervals. In step S1702, the signals without guard intervals are converted into parallel signals.

Subsequently, in step S1703, the parallel signals are converted into signals of a frequency domain. In step S1704, pilot signals are extracted out of the frequency-domain signals. In step S1705, distortion of a reception channel including multipath and feedback signals is estimated.

In step S1706, an inverse value to the estimated channel distortion is generated and, in step S1707, the generated inverse value of channel distortion is transformed into signals of a time domain and the time-domain signals are transmitted to the adaptation filter.

Figure 18:
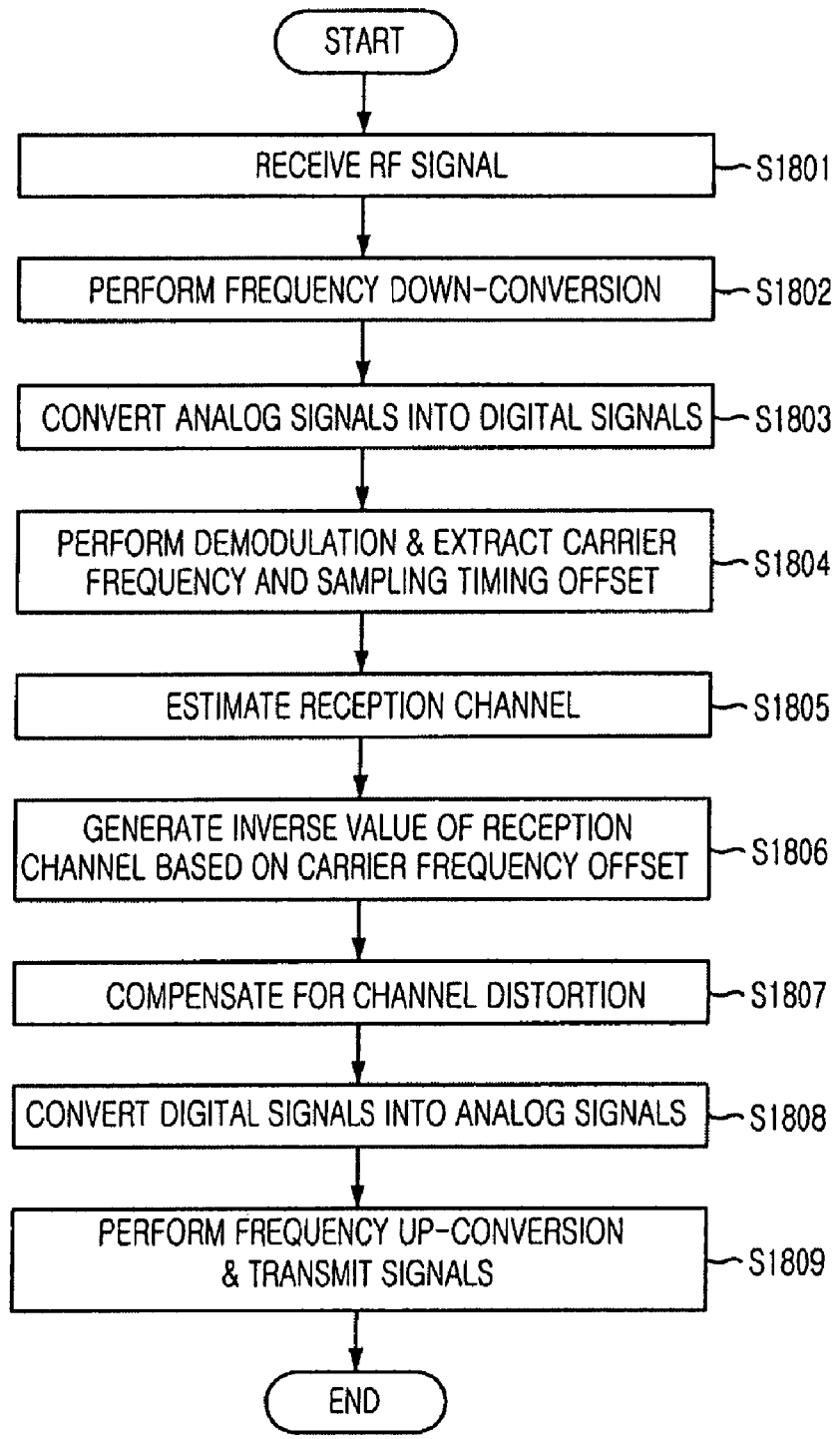
FIG. 18 is a flowchart illustrating a method for repeating signals though an on-channel in accordance with yet another embodiment of the present invention.

FIG. 18 is a flowchart illustrating a method for repeating signals though an on-channel in accordance with yet another embodiment of the present invention.

As shown in the drawing, on-channel signal repeating begins as a repeater receives RF signals transmitted form the main transmitter or another repeater in step S1801.

In step S1802, the received RF signals are down-converted into signals of a desired band.

In step S1803, the down-converted analog signals are converted into digital signals and, in step S1804, the obtained digital signals are demodulated into signals of a baseband to extract carrier frequency offset and sampling timing offset.

Subsequently, in step S1805, a reception channel of the repeater including multipath signals generated by a transmission channel and feedback signals generated due to a low isolation of the transmitting and receiving antennas of the on-channel repeater is estimated from the demodulated baseband signals.

In step S1806, an inverse value to the estimated reception channel information of the repeater is acquired and the carrier frequency offset extracted in the step S1804 is taken into the inverse value.

In step S1807, channel distortion including multipath signals and feedback signals is compensated by filtering digital signals obtained from the conversion in the step S1803 through an adaptation filter having the inverse value of the repeater reception channel information.

In step S1808, the channel distortion-compensated digital signals are converted into analog signals by reflecting the sampling timing offset extracted in the step S1804. In step S1809, the analog signals are up-converted into RF signals and then transmitted.

The on-channel repeater and a signal repeating method thereof, which are suggested in the present invention, are suitable for broadcasting systems based on the Advanced Television System Committee (ATSC), Digital Video Broadcasting (DVB), Digital Multimedia Broadcasting (DMB) or Integrated Service Digital Broadcasting-Terrestrial (ISDB-T) and communication systems based on Wibro or Code Division Multiple Access (CDMA). However, they are not limited to those systems but they can be applied to an environment requiring repeaters to form a general single frequency network.

While the present invention has been described with respect to certain preferred embodiments, it will be apparent to those skilled in the art that various changes and modifications may be made without departing from the scope of the invention as defined in the following claims.

What is claimed is:

1. An on-channel repeater for repeating signals through on-channel, comprising:
   a receiving means for receiving radio frequency (RF) signals transmitted from outside;
   a down-converting means for down-converting the received RF signals into signals of a desired band;
   a channel-estimating means for estimating an inverse value of a reception channel based on the down-converted signals;
   a filtering means for compensating for channel distortion by using a filter having the inverse value of the estimated reception channel;
   an up-converting means for up-converting the channel distortion-compensated signals into RF signals; and a transmitting means for transmitting the up-converted RF signals.

2. The on-channel repeater as recited in claim 1, wherein the channel estimating means includes:
a demodulator for demodulating the down-converted signals into baseband signals;
a channel estimator for estimating a reception channel based on the baseband signals; and
a transformer for acquiring an inverse value of the estimated reception channel.

3. The on-channel repeater as recited in claim 2, wherein the demodulator includes:
a guard interval removal for removing guard intervals out of the down-converted signals;
a serial-parallel converter for converting the signals without a guard interval into parallel signals; and
a domain transformer for transforming the parallel signals into signals of a frequency domain.

4. The on-channel repeater as recited in claim 3, wherein the channel estimator includes:
a pilot extractor for extracting pilot signals; and
a pilot estimator for estimating distortion of a reception channel by comparing the extracted pilot signals with predetermined pilot signals.

5. The on-channel repeater as recited in claim 4, wherein the transformer includes:
an inverse transformer for generating an inverse value of reception channel distortion; and
a domain transformer for transforming the inverse value of reception channel distortion into a signal of a time domain.

6. The on-channel repeater as recited in claim 2, wherein the channel estimator includes:
a pilot extractor for extracting pilot signals; and
a pilot estimator for estimating distortion of a reception channel by comparing the extracted pilot signals with predetermined pilot signals.

7. An on-channel repeater for repeating signals through on-channel, comprising:
a receiving means for receiving radio frequency (RF) signals transmitted from outside;
a down-converting means for down-converting the received RF signals into signals of a desired band;
a digital-analog converting means for converting the down-converted signals into digital signals;
a channel-estimating means for estimating an inverse value of a reception channel based on the digital signals;
a filtering means for compensating for channel distortion by using a filter having the inverse value of the estimated reception channel;
an analog-digital converting means for converting the channel distortion-compensated signals into analog signals;
an up-converting means for up-converting the analog signals into RF signals; and
a transmitting means for transmitting the up-converted RF signals.

8. The on-channel repeater as recited in claim 7, wherein the channel estimating means includes:
a demodulator for demodulating the digital signals into baseband signals and extracting a carrier frequency offset and a sampling timing offset;
a channel estimator for estimating a reception channel based on the baseband signals; and
a transformer for acquiring an inverse value of the estimated reception channel based on the carrier frequency offset.

9. The on-channel repeater as recited in claim 8, wherein the digital-analog converting means and the analog-digital converting means convert signals based on the sampling timing offset.

10. The on-channel repeater as recited in claim 8, wherein the demodulator includes:
a guard interval removal for removing guard intervals out of the digital signals;
a serial-parallel converter for converting the signals without a guard interval into parallel signals; and
a domain transformer for transforming the parallel signals into signals of a frequency domain.

11. The on-channel repeater as recited in claim 8, wherein the channel estimator includes:
a pilot extractor for extracting pilot signals; and
a pilot estimator for estimating distortion of a reception channel by comparing the extracted pilot signals with predetermined pilot signals.

12. A method for repeating signals through on-channel, comprising the steps of:
receiving radio frequency (RF) signals transmitted from outside in a repeater;
down-converting the received RF signals into signals of a desired band;
estimating an inverse value of a reception channel of the repeater based on the down-converted signals;
compensating for distortion on a transmission channel by using a filter having the inverse value of the estimated reception channel;
up-converting the channel distortion-compensated signals into RF signals; and
transmitting the RF signals.

13. The on-channel repeater as recited in claim 12, wherein said estimating an inverse value of a reception channel of the repeater based on the down-converted signals includes the steps of:
demodulating the down-converted signals into baseband signals;
estimating a reception channel based on the baseband signals; and
acquiring an inverse value of the estimated reception channel.

14. The on-channel repeater as recited in claim 13, wherein said demodulating the down-converted signals into baseband signals includes the steps of:
removing guard intervals out of the down-converted signals;
converting the signals without a guard interval into parallel signals; and
transforming the parallel signals into signals of a frequency domain.

15. The on-channel repeater as recited in claim 14, wherein said estimating a reception channel based on the baseband signals includes the steps of:
extracting pilot signals; and
estimating distortion of a reception channel by comparing the extracted pilot signals with predetermined pilot signals.

16. The on-channel repeater as recited in claim 15, wherein said acquiring an inverse value of the estimated reception channel includes the steps of:
generating an inverse value of reception channel distortion; and
transforming the inverse value of reception channel distortion into a signal of a time domain.

17. The on-channel repeater as recited in claim 13, wherein said estimating a reception channel based on the baseband signals includes the steps of:
   extracting pilot signals; and
   estimating distortion of a reception channel by comparing the extracted pilot signals with predetermined pilot signals.

18. A method for repeating signals through on-channel, comprising the steps of:
   receiving radio frequency (RF) signals transmitted from outside in a repeater;
   converting the received RF signals into signals of a desired band;
   converting the down-converted signals into digital signals;
   estimating an inverse value of a reception channel based on the digital signals;
   compensating for channel distortion by using a filter having the inverse value of the estimated reception channel;
   converting the channel distortion-compensated signals into analog signals;
   up-converting the analog signals into RF signals; and
   transmitting the up-converted RF signals.

19. The method as recited in claim 18, wherein said estimating an inverse value of a reception channel based on the digital signals includes the steps of:
   demodulating the digital signals into baseband signals and extracting a carrier frequency offset and a sampling timing offset;
   estimating a reception channel based on the baseband signals; and
   acquiring an inverse value of the estimated reception channel based on the carrier frequency offset.

20. The on-channel repeater as recited in claim 19, wherein the signals are converted based on the sampling timing offset in said converting the down-converted signals into digital signals and said converting the channel distortion-compensated signals into analog signals.

21. The on-channel repeater as recited in claim 19, wherein said demodulating the digital signals into baseband signals and extracting a carrier frequency offset and a sampling timing offset includes:
   removing guard intervals out of the digital signals;
   converting the signals without a guard interval into parallel signals; and
   transforming the parallel signals into signals of a frequency domain.

22. The on-channel repeater as recited in claim 19, wherein said estimating a reception channel based on the baseband signals includes the steps of:
   extracting pilot signals; and
   estimating distortion of a reception channel by comparing the extracted pilot signals with predetermined pilot signals.

* * * * *